M. E. A. W. Evard,
Gridiron.
No. 70,314.  Patented Apr. 7, 1868.
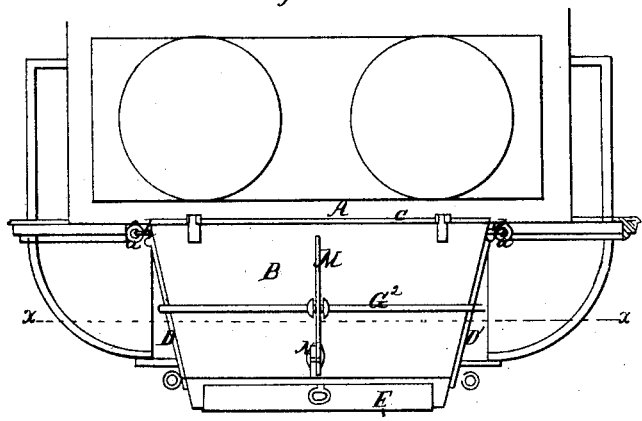
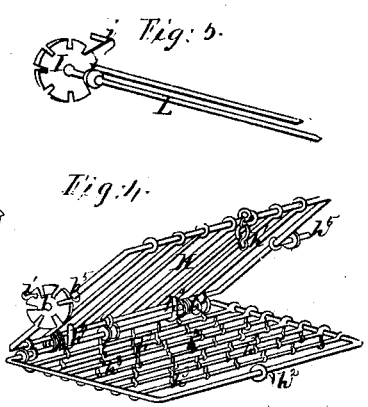
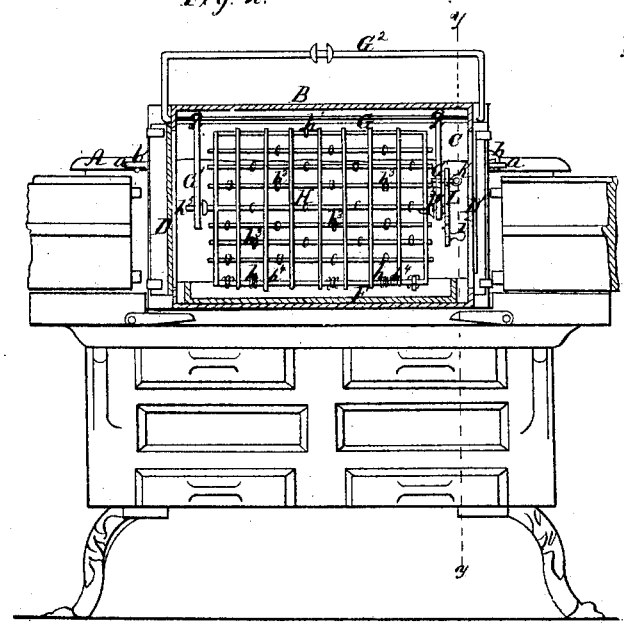
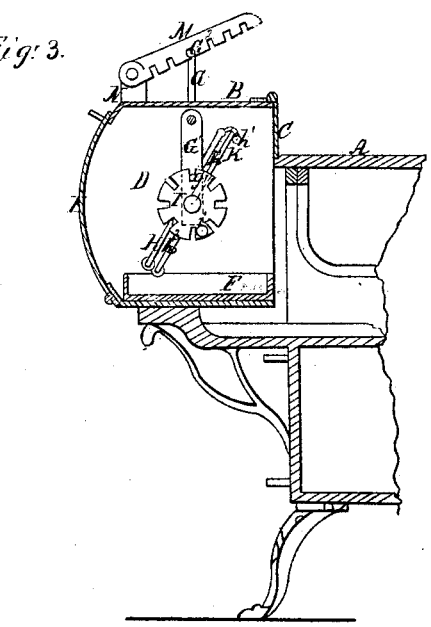
Witnesses:
Geo. A. Morrison
J. E. McBowen
Inventor:
Mary E. A. W. Evard
By Kingsby Bro.
Attorneys

United States Patent Office.

MARY E. A. W. EVARD, OF LEESBURG, VIRGINIA.

Letters Patent No. 76,314, dated April 7, 1868.

---

IMPROVEMENT IN BROILING-APPARATUS.

---

The Schedule referred to in these Letters Patent and making part of the same.

---

TO ALL WHOM IT MAY CONCERN:

Be it known that I, MARY E. A. W. EVARD, of Leesburg, in the county of Loudon, and State of Virginia, have invented a new and useful Improved Combined Broiler and Roasting-Oven; and I do hereby declare the following to be a full, clear, and exact description of the same, reference being had to the accompanying drawings which are made a part of this specification.

The object of this invention is a device for adjustably holding and turning a piece of meat or a fowl while broiling or roasting, the meat being suspended within an oven or reflector, to be applied to the front of the stove before the grate. In the drawings—

Figure 1 is a plan view of my invention applied to a stove.
Figure 2 is a vertical longitudinal section at $x\ x$, fig. 1.
Figure 3 is a transverse section at $y\ y$, fig. 2.
Figure 4 is a detached perspective view of the broiler, and
Figure 5 is a similar view of the roasting-spit.

A, figs. 1, 2, and 3, may represent the top of the stove, which, for the attachment of my invention, is provided with eyes or staples, $a$, in which the hooks, $b\ b$, on the sides of the oven B, rest. The oven B is constructed with a curved back, and sides flaring toward its mouth, so as to form a reflector to reflect and concentrate the heat, and cause it to act to a certain extent on all parts of the piece of meat being roasted or broiled. It is provided with a door or flap, C, to close the aperture above the top of the stove, and thus prevent the escape of heat or scent, and with doors, D, D', and E, which are situated respectively at its ends and back, and through which ingress is had to its interior, to inspect, turn, and baste the meat during the cooking operation. Another important function of these doors, C D D' E, is by opening some or all of them to regulate or check the cooking operation, as becomes necessary. F is a removable pan placed in the bottom of the oven to receive the drippings. G represents a continuous bar, to which, at $g\ g$, hangers $G^1\ G^1$ are rigidly attached, and which, at $G^2$, forms a handle by which the frame is operated. The hangers $G^1$ are slotted at their lower ends to form bearings for the trunnions of the broiler or spit. H is the broiler, which is composed of two wire frames or leaves hinged together at $h\ h$, between which the meat is held by one of the links, $h^1$, being placed over the hook, $h^2$. One of the frames is studded with pointed projections, $h^3$, which, by piercing the meat, conduct heat to its interior, and serve also to prevent it from slipping, and with two or more longer projections, $h^4$, which serve as guards or stops to prevent the meat slipping or being accidentally placed between the hinged edges of the frames. The other frame is provided with trunnions, $h^5$, which have their bearings in the slots in the lower ends of the hangers $G^1$. One of the trunnions $h^5$ is provided with a slotted disk, I, which has a handle, $i$, by which the broiler is turned, it being held in any desired position by inserting the pin K, through one of the slots, into the hole $g'$ in the hanger. L, fig. 5, is a spit, which is substituted for the broiler H for roasting purposes. It is supported between the hangers the same as the broiler, and is rotated and held in the same manner as it. The handle $G^2$, by which the frame is moved nearer or farther from the fire, as desired, is held in any desired position by means of a notched plate, M, which is hinged to the upright projection N on top of the oven, as shown in fig. 3.

Having thus described my invention, what I claim as new, and desire to secure by Letters Patent, is—

1. The combination of the pivoted frame $G\ G^1\ G^2$ and hinged notched plate M, for supporting the revolving broiler or spit at any desired distance from the fire, substantially as described.

2. The combined arrangement, in connection with the foregoing, of the oven B, of the flap C, and doors D, D', and E, substantially as and for the purposes set forth.

M. E. A. W. EVARD.

Witnesses:
GEO. R. HEAD,
R. I. C. THOMPSON.